US008526037B2

(12) United States Patent
Emori et al.

(10) Patent No.: US 8,526,037 B2
(45) Date of Patent: Sep. 3, 2013

(54) PRINTING SERVICE PROVIDING METHOD AND PRINTING SERVICE PROVIDING SYSTEM

(75) Inventors: Mototsugu Emori, Saitama (JP); Hiroshi Hiraki, Kanagawa (JP); Hiroki Kohmura, Kanagawa (JP); Takuma Katori, Tokyo (JP); Kengo Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 286 days.

(21) Appl. No.: 12/487,963

(22) Filed: Jun. 19, 2009

(65) Prior Publication Data

US 2010/0079785 A1  Apr. 1, 2010

(30) Foreign Application Priority Data

Jun. 19, 2008 (JP) ................................ 2008-159891
Apr. 30, 2009 (JP) ................................ 2009-111049

(51) Int. Cl.
| | | |
|---|---|---|
| G06F 15/167 | (2006.01) | |
| G06F 3/12 | (2006.01) | |
| G06F 15/173 | (2006.01) | |
| G06F 15/16 | (2006.01) | |
| G06K 15/00 | (2006.01) | |

(52) U.S. Cl.
USPC ......... 358/1.15; 358/1.14; 709/213; 709/224; 709/206; 702/186

(58) Field of Classification Search
USPC .............. 358/1.15, 1.14, 1.18; 709/206, 244
See application file for complete search history.

(56) References Cited

U.S. PATENT DOCUMENTS

| | | | | |
|---|---|---|---|---|
| 7,752,276 B2 * | 7/2010 | Aschauer et al. | ............. | 709/206 |
| 2003/0093490 A1 * | 5/2003 | Yamamoto et al. | ............ | 709/213 |
| 2005/0107985 A1 * | 5/2005 | Agrawal et al. | ............... | 702/186 |
| 2005/0162687 A1 * | 7/2005 | Lee | ............................... | 358/1.15 |
| 2008/0117451 A1 * | 5/2008 | Wang | ............................ | 358/1.15 |
| 2008/0195730 A1 * | 8/2008 | Hasegawa et al. | ............. | 709/224 |

FOREIGN PATENT DOCUMENTS

| | | |
|---|---|---|
| CN | 1567284 A | 1/2005 |
| EP | 1 309 170 A2 | 5/2003 |
| JP | 2002-158770 A | 5/2002 |
| JP | 2003-152695 | 5/2003 |
| JP | 2005-14591 A | 1/2005 |
| JP | 2005-235035 | 9/2005 |
| WO | WO 2007/024305 A2 | 3/2007 |

OTHER PUBLICATIONS

Extended Search Report issued Jul. 28, 2011 in Europe Application No. 09163026.9.
Chinese Office Action issued on Apr. 26, 2011 in corresponding Chinese Application No. 200910173326.3 (with an English Translation).
Office Action mailed Apr. 2, 2013, in Japanese Application No. 2009-111049, filed Apr. 30, 2009, pp. 1-11, (w/o English translation).

* cited by examiner

*Primary Examiner* — Akwasi M Sarpong
(74) *Attorney, Agent, or Firm* — Oblon, Spivak, McClelland, Maier & Neustadt, L.L.P.

(57) ABSTRACT

A client terminal transmits a call request for using a MFP to a call control server. The call control server carries out authentication processing about a user and the MFP in response to the call request. If the authentication processing result is correct, the call control server transfers the call request to the printing service management server. The call request is transferred from the printing service management server to a printing service providing server and then transferred to the MFP via the call control server. Thus, a session of the client terminal and the MFP is established. The printing service providing server carries out processing for providing a predetermined printing service based on the call request from the client terminal.

22 Claims, 15 Drawing Sheets

FIG.7

PRINT BILL DB

| DATE AND TIME | SERVICE TYPE | USER ID | TERMINAL ID (MFP ID) | FEE | EVALUATION | ... |
|---|---|---|---|---|---|---|
| XXXX/XX/XX | COPY | xxx12345 | xxx3456 | 100 | ○ | ... |
| XXXX/XX/XX | CONVERSION | xxx7890 | xxx2323 | 50 | × | ... |
| ⋮ | ⋮ | ⋮ | ⋮ | ⋮ | ⋮ | ⋮ |

FIG.8

CLIENT INFORMATION DB 31

| ID | SECURITY INFORMATION | | CONTRACT SERVICE INFORMATION | |
|---|---|---|---|---|
| | USER NAME | PASSWORD | SERVICE ID | TRANSFER DESTINATION |
| sip:user1@ricoh.co.jp | user1 | password1 | print | sip:srv_mgr@ricoh.co.jp |
| sip:mfp@ricoh.co.jp | user2 | password2 | – | – |
| sip:srv_mgr@ricoh.co.jp | – | password2 | – | – |
| sip:srv@ricoh.co.jp | – | – | – | – |

FIG.9

DEVICE MANAGEMENT DB 41

MFP INFORMATION

| ID | DEVICE NAME | BELONGING ORGANIZATION |
|---|---|---|
| sip:mfp@ricoh.co.jp | imagio MP C3000 | ricoh |

USAGE HISTORY

| ID | SERVICE ID | USER | TIME | PRINT DOCUMENT |
|---|---|---|---|---|
| sip:mfp@ricoh.co.jp | print | sip:user1@ricoh.co.jp | 13:00 | sample.pdf |

FIG.10

CONTRACT ORGANIZATION DB 42

ORGANIZATION INFORMATION

| ORGANIZATION ID | ORGANIZATION NAME | USABLE SERVICE |
|---|---|---|
| ricoh | RICOH | print |

USAGE HISTORY

| ORGANIZATION ID | USER | USED SERVICE | TIME |
|---|---|---|---|
| ricoh | sip:user1@ricoh.co.jp | print | 13:00 |

FIG.11

USER DB 43

USER INFORMATION

| ID | NAME | CONTRACT SERVICE INFORMATION | BELONGING ORGANIZATION |
|---|---|---|---|
| | | SERVICE ID | |
| sip:user1@ricoh.co.jp | EMORI MOTOTSUGU | print | ricoh |

USAGE HISTORY

| ID | SERVICE ID | TIME |
|---|---|---|
| sip:user1@ricoh.co.jp | print | 13:00 |

FIG.12

SERVICE INFORMATION DB 44

MFP INFORMATION

| SERVICE ID | ID OF SERVICE PROVIDING SERVER |
|---|---|
| print | sip:srv@ricoh.co.jp |

USAGE HISTORY

| SERVICE ID | USER | TIME |
|---|---|---|
| print | sip:user1@ricoh.co.jp | 13:00 |

PRINTING SERVICE PROVIDING METHOD AND PRINTING SERVICE PROVIDING SYSTEM

BACKGROUND OF THE INVENTION

1. Field of the Invention

The present invention relates to a printing service providing method, etc. which provide printing services by using Session Initiation Protocol (SIP).

2. Description of the Related Art

Recently, standardization of Next Generation Network (NGN) is underway as a communication infrastructure of a next generation. Aims of NGN are to realize a ubiquitous network society and to realize a communication network that provides various services. In this NGN, SIP is basically employed as a communication protocol and is utilized in setting/management of sessions between terminals and between a terminal and a server.

Meanwhile, many network printing systems in which a plurality of client terminals and a plurality of printing apparatuses are connected to a network so that the client terminals can use the printing apparatuses via the network have been realized.

For example, as disclosed in Unexamined Japanese Patent Application KOKAI Publication No. 2005-235035, a contents printing system which provides printing services of contents via the Internet has been invented.

However, in a conventional network printing system, printing apparatuses which are under control of a network in an organization have been used in order to maintain security in each organization, and the printing apparatuses which are not under control of the network of the organization such as printing apparatuses installed in outside stores have not been practically used.

Therefore, realization of a network printing system which enables usage of printing services while maintaining security and sharing printing apparatuses among organizations has been desired as a system of the next generation.

SUMMARY OF THE INVENTION

The present invention has been accomplished in view of the above described problems, and it is an object to provide a printing service providing method, etc. which enables usage of printing services while maintaining security and sharing printing apparatuses.

An aspect of the present invention is a printing service providing method of a system comprising a client terminal, a printing apparatus, a call control server, and a printing service server connected to a network, the printing service providing method including:

a step of transmitting a call request, which is for using the printing apparatus, by the client terminal to the call control server;

an authentication step of receiving the call request and carrying out authentication processing based on the call request by the call control server;

a step of, if a result of the authentication processing carried out in the authentication step is correct, transferring the call request to the printing service server by the call control server and establishing a session of the client terminal and the printing apparatus; and a printing service providing step of carrying out processing for providing a predetermined printing service by the printing service server based on the call request.

Another aspect of the present invention is a printing service providing system comprising a client terminal, a printing apparatus, a call control server, and a printing service server connected to a network, wherein the call control server has:

a receiving unit receiving a call request, which is for using the printing apparatus, from the client terminal; an authentication unit carrying out authentication processing in response to the call request; and a session establishing unit, if a result of the authentication processing is correct, transferring the call request to the printing service server and establishing a session of the client terminal and the printing apparatus; and the printing service server has:

a receiving unit receiving the call request from the call control server and a printing service providing unit carrying out processing for providing a predetermined printing service based on the call request.

Another aspect of the present invention is a call control sever comprising:

a receiving unit receiving a call request, which is for using a printing apparatus, from a client terminal;

an authentication unit carrying out authentication processing based on the call request; and a session establishing unit, if a result of the authentication processing carried out by the authentication unit is correct, transferring the call request to a printing service server, which carries out processing for providing a printing service, and establishing a session of the client terminal and the printing apparatus.

Another aspect of the present invention is a computer-readable recording medium recording a program which causes a computer to function as:

a receiving unit receiving a call request, which is for using a printing apparatus, from a client terminal;

an authentication unit carrying out authentication processing in response to the call request; and a session establishing unit, if a result of the authentication processing carried out by the authentication unit is correct, transferring the call request to a printing service server, which carries out processing for providing a printing service, and establishing a session of the client terminal and the printing apparatus.

Another aspect of the present invention is a printing service providing method of a printing service providing system comprising a client terminal, a printing apparatus, a call control server, and a printing service management server connected to a network, the printing service providing method including:

a step of transmitting a request message to the call control sever by the client terminal, the request message including information specifying the printing apparatus;

a transfer step of transferring the request message to the printing service management server by the call control server; and an authentication step of carrying out authentication processing by the printing service management server based on the information included in the request message and specifying the printing apparatus.

Another aspect of the present invention is a printing service providing system comprising a client terminal, a printing apparatus, a call control server, and a printing service management server connected to a network, wherein the client terminal comprises a transmitting unit transmitting a request message including information specifying the printing apparatus to the call control server;

the call control server comprises a transfer unit transferring the request message to the printing service management server; and the printing service management server comprises an authentication unit carrying out authentication processing based on the information included in the request message and specifying the printing apparatus.

According to the present invention, a printing service providing system capable of maintaining security and using printing services while sharing printing apparatuses can be realized.

BRIEF DESCRIPTION OF THE DRAWINGS

These objects and other objects and advantages of the present invention will become more apparent upon reading of the following detailed description and the accompanying drawings in which:

FIG. 7 is a drawing exemplarily showing bill information registered in a print bill DB;

FIG. 8 is a drawing showing a configuration example of a client information DB;

FIG. 9 is a drawing showing a configuration example of a device management DB;

FIG. 10 is a drawing showing a configuration example of a contract organization DB;

FIG. 11 is a drawing showing a configuration example of a user information DB;

FIG. 12 is a drawing showing a configuration example of a service information DB;

DETAILED DESCRIPTION OF THE PREFERRED EMBODIMENTS

First Embodiment

Hereinafter, a printing service management system according to an embodiment of the present invention will be explained with reference to drawings.

Figure 1:
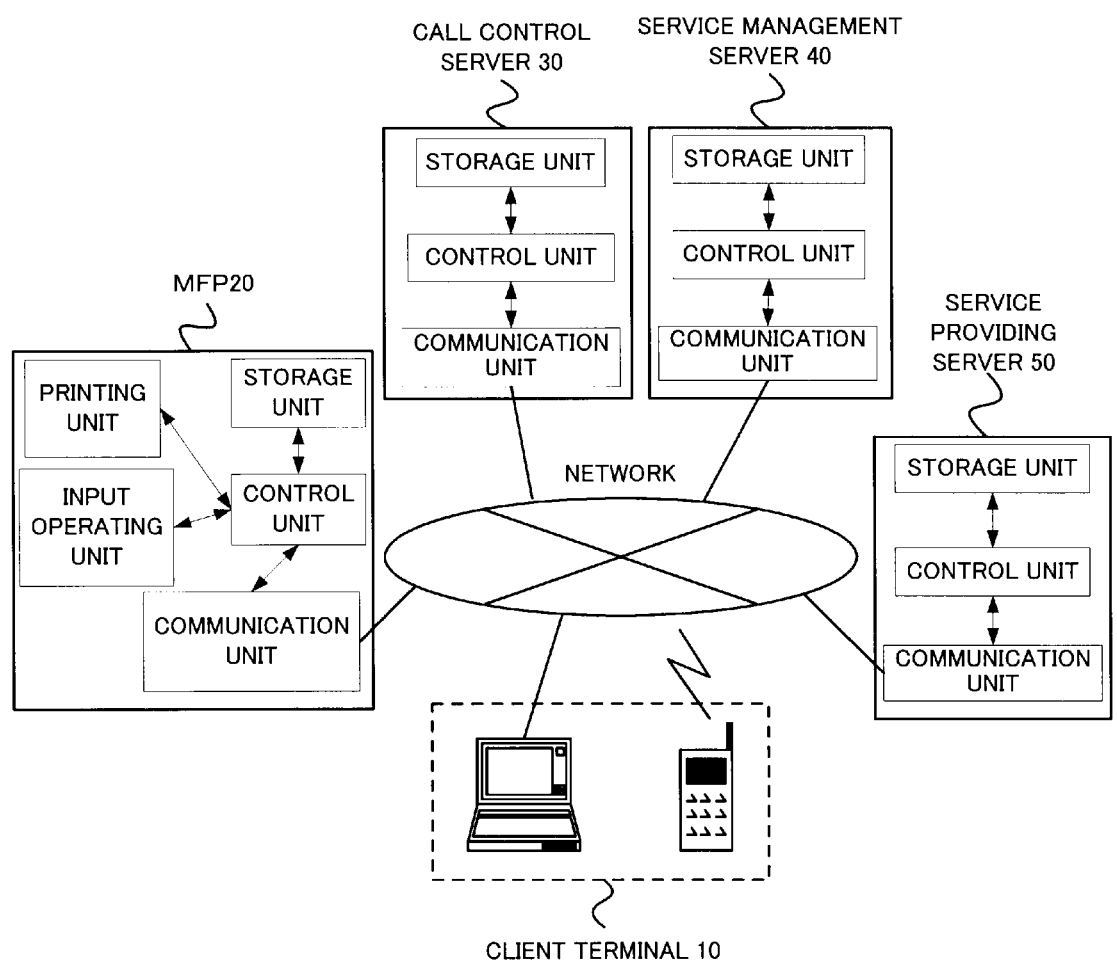
FIG. 1 is a drawing exemplarily showing a configuration of a printing service management system according to an embodiment of the present invention.

A system configuration of the printing service management system according to the embodiment of the present invention is exemplarily shown in FIG. 1. As shown in the drawing, the printing service management system has client terminals 10, a Multi Function Printer (MFP) 20, a call control server 30, a service management server 40, and a service providing server 50. These apparatuses are connected via a network such as a Next Generation Network (NGN) or the Internet.

The client terminals 10 include personal computers, portable terminals, portable phones, etc. and each client terminal comprises a computer having a control unit, a storage unit, a communication unit, an input unit, and a display unit. The control unit of the client terminal 10 carries out processing for using various printing services by reading and executing operation programs stored in the storage unit. The storage unit of the client terminal 10 stores information of user IDs, etc. for identifying users.

The MFP 20 is an apparatus which is installed in a satellite office such as a tea parlor or a store and has a plurality of image formation functions of a copying machine, a printer, a fax machine, etc., and the MFP has a control unit, a storage unit, an input operating unit, a printing unit, and a communication unit. The storage unit of the MFP 20 stores information such as an ID of the MFP for identifying the MFP 20.

The call control server (Session Initiation Protocol (SIP) server) 30 comprises a computer having a control unit, a storage unit, and a communication unit. The control unit carries out processing of call control, session management, etc. based on SIP between the apparatuses of the client terminal 10, the MFP 20, the service management server 40, and the service providing server 50 by reading and executing operation programs stored in the storage unit. The storage unit of the call control unit server 30 has a device management DB, a contract organization DB, a user DB, and a session management table.

In the device management DB, MFP information about the MFPs 20 used in the present system (for example, device IDs of the MFPs 20, organization IDs of the organizations to which the MFPs 20 belong, usage history information of the MFPs 20) is registered. In the contract organization DB, contract organization information about organizations which have a contract for printing services provided by the present system (for example, organization IDs, organization names, services which can be used by the organizations, usage history information of each of the organizations) is registered. In the user DB, user information about the users who belong to the organizations which have the contract for the printing services by the present system (for example, IDs of the users, the organization IDs of the organizations to which the users belong, usage history information of each of the users) is registered. In the session management table, session management information for managing sessions (for example, session IDs, the IDs of the users, the IDs of the MFPs, the organization IDs, etc.) is recorded.

The service management server 40 comprises a computer having a control unit, a storage unit, and a communication unit. The control unit carries out processing for managing provision of the printing services by reading and executing operation programs stored in the storage unit. In addition, the storage unit stores the information which associates the printing services provided by the present system with the service providing server 50.

The service providing server 50 is provided, for example, for each organization which carries out service provision, and the service providing server 50 comprises a computer having a control unit, a storage unit, and a communication unit. The control unit carries out predetermined printing service processing by reading and executing operation programs stored in the storage unit. The printing services include, for example, conversion/accumulation/multicast of print data, print function restrictions, recording of print logs, and billing. In addition, the storage unit has DBs corresponding to the services provided by the service providing server 50. The DBs include, for example, a print data DB which saves print data, a print policy DB in which restriction contents of print functions (for example, "multicast is for ten people at most") are registered, a print log DB in which print logs are recorded, a print bill DB in which bill information is recorded.

Figure 2:
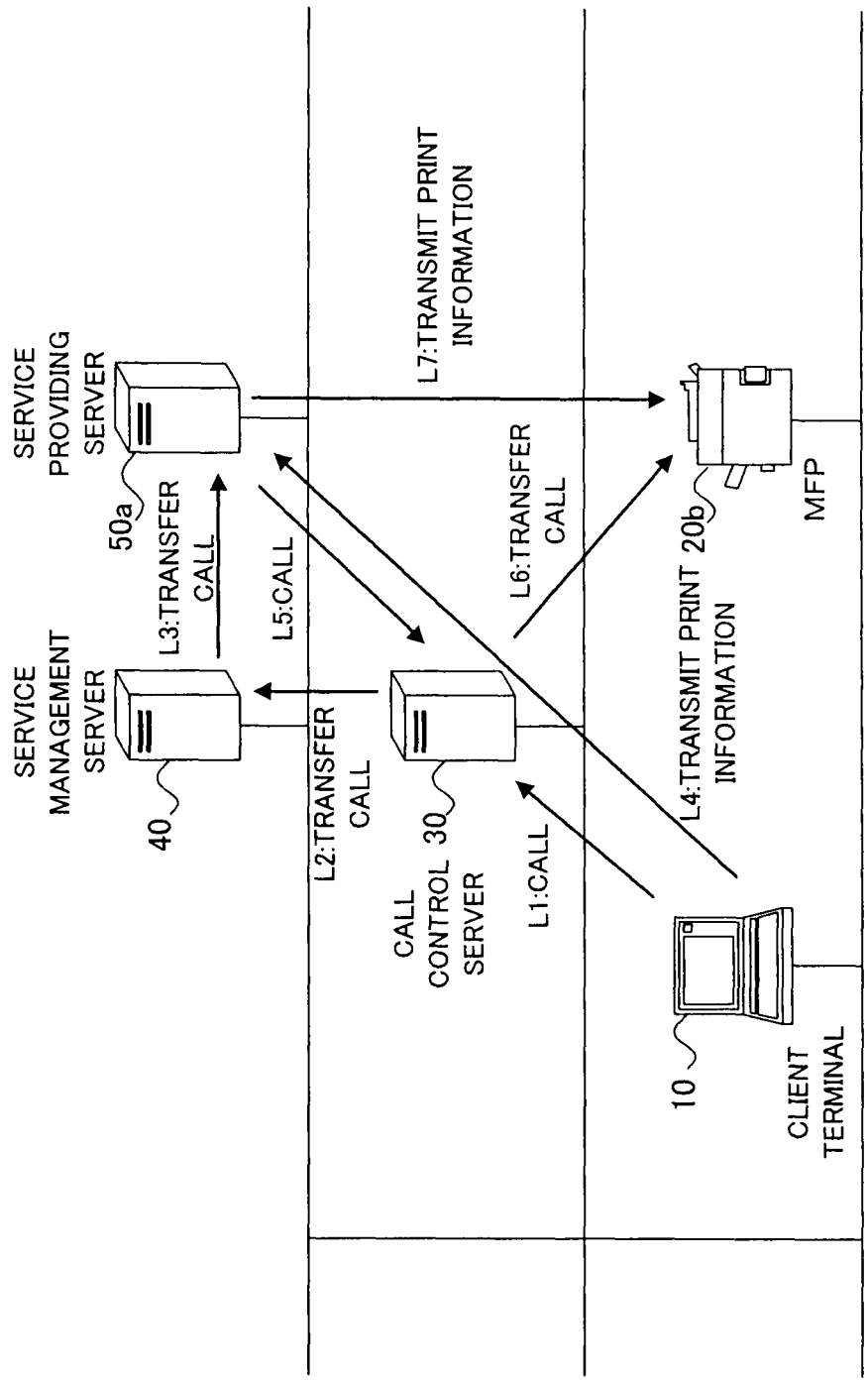
FIG. 2 is a drawing for explaining operation of the printing service management system according to the embodiment of the present invention.

Next, operation of the printing service management system according to the embodiment of the present invention will be explained with reference to FIG. 2 by taking the case in which a user uses a satellite office printing service as an example. Herein, an employee of a company A is to print data, which is retained by the client terminal 10, from a MFP 20*b* installed in a store B, which is a satellite office, (hereinafter, the MFP in the store B will be referred to as "MFP 20*b*").

First, the employee inputs the ID (the MFP ID) of the MFP 20*b* and an execution request of a printing service (for example, printing of file data stored in a server of his/her company) to the client terminal 10 that he/she owns. In response to this operation, the client terminal 10 transmits a request message (call) including the ID of the user, the ID of the MFP, and data of printing service contents to the call control server 30 (L1).

The call control server 30 carries out user authentication based on the received ID of the user and checks whether the MFP 20*b* specified by the received MFP ID can be used or not. Specifically, for example, the call control server 30 checks whether the received user ID is registered in the user DB or not and whether the received MFP ID is registered in the device management DB or not. When both of them are registered, the call control server 30 generates a session management ID, records session management information in the session management table, adds the session ID to the request message, which is from the client terminal 10, and transfers the message to the service management server 40 (L2). In response to this, the service management server 40 transfers the request message to a service providing server 50*a* corresponding to the print request (hereinafter, the service providing server of the company A will be referred to as "service providing server 50*a*") (L3). The service providing server 50*a*, which has received the request message, transmits a response message to the call control server 30, and the call control server 30 transfers the response message to the client terminal 10. As a result, a session is established between the client terminal 10 and the service providing server 50*a*.

Next, when the employee of the company A inputs a print request to the client terminal 10, the client terminal 10 transmits print information including the print data, the session ID, etc. to the service providing server 50*a* together with the print request (L4). In response to this, the service providing server 50*a* carries out predetermined printing service processing about the received print data and transmits a request message (call) including the organization ID of the company A, the MFP ID of the MFP 20*b*, and the data of the printing service contents to the call control server 30 (L5).

The call control server 30 checks whether the received organization ID is registered in the contract organization DB or not and whether the received MFP ID is registered in the device management DB or not. When both of them are registered therein, the call control server 30 generates a session management ID, records the session management information in the session management table of the storage unit, adds the session ID to the request message, which is from the service providing server 50*a*, and transfers the message to the MFP 20*b* (L6). The MFP 20*b*, which has received the request message, transmits a response message to the call control server 30, and the call control server 30 transfers the response message to the service providing server 50*a*. As a result, a session is established between the service providing server 50*a* and the MFP 20*b*.

Next, the service providing server 50*a* transmits print information including the print data, the session ID, etc. to the MFP 20*b* together with the print request (L7). In response to this, the MFP 20*b* prints out the received print data.

Note that the printing service processing executed in the service providing server 50*a* includes, for example, conversion, accumulation, multicast of the print data, print function restriction, recording of print logs, and billing.

If the printing service processing is conversion of the print data, the service providing server 50*a* subjects the print data, which is received from the client terminal 10, to predetermined conversion processing (for example, format conversion, synthesis with other data). Then, converted print data is transmitted to the MFP 20*b*.

If the printing service processing is accumulation of the print data, the service providing server 50*a* saves the print data, which is received from the client terminal 10, in the print data DB of the storage unit.

If the printing service processing is multicast of the print data, the service providing server 50*a* transmits a request message (call), which specifies the MFP IDs of the MFPs 20 at a plurality of transfer destinations, to the call control server 30. The call control server 30 checks the organization ID and the MFP IDs, and then transmits the request message (call) to each of the MFPs 20, thereby establishing sessions between the service providing server 50*a* and the MFPs 20. Then, the service providing server 50*a* transmits the print data to each of the MFPs 20 together with a print request.

If the printing service processing is a print function restriction, the service providing server 50*a* references the printing policy DB of the storage unit so as to determine whether the service contents violate the restriction contents or not. If the case of violation, the service providing server transmits an error message to the client terminal 10.

If the printing service processing is recording of a print log, the service providing server 50*a* saves a print log in the print data DB of the storage unit.

If the printing service processing is billing, the service providing server 50*a* references the print bill DB of the storage unit and records bill information. Details of the billing process will be described later.

Figure 3:
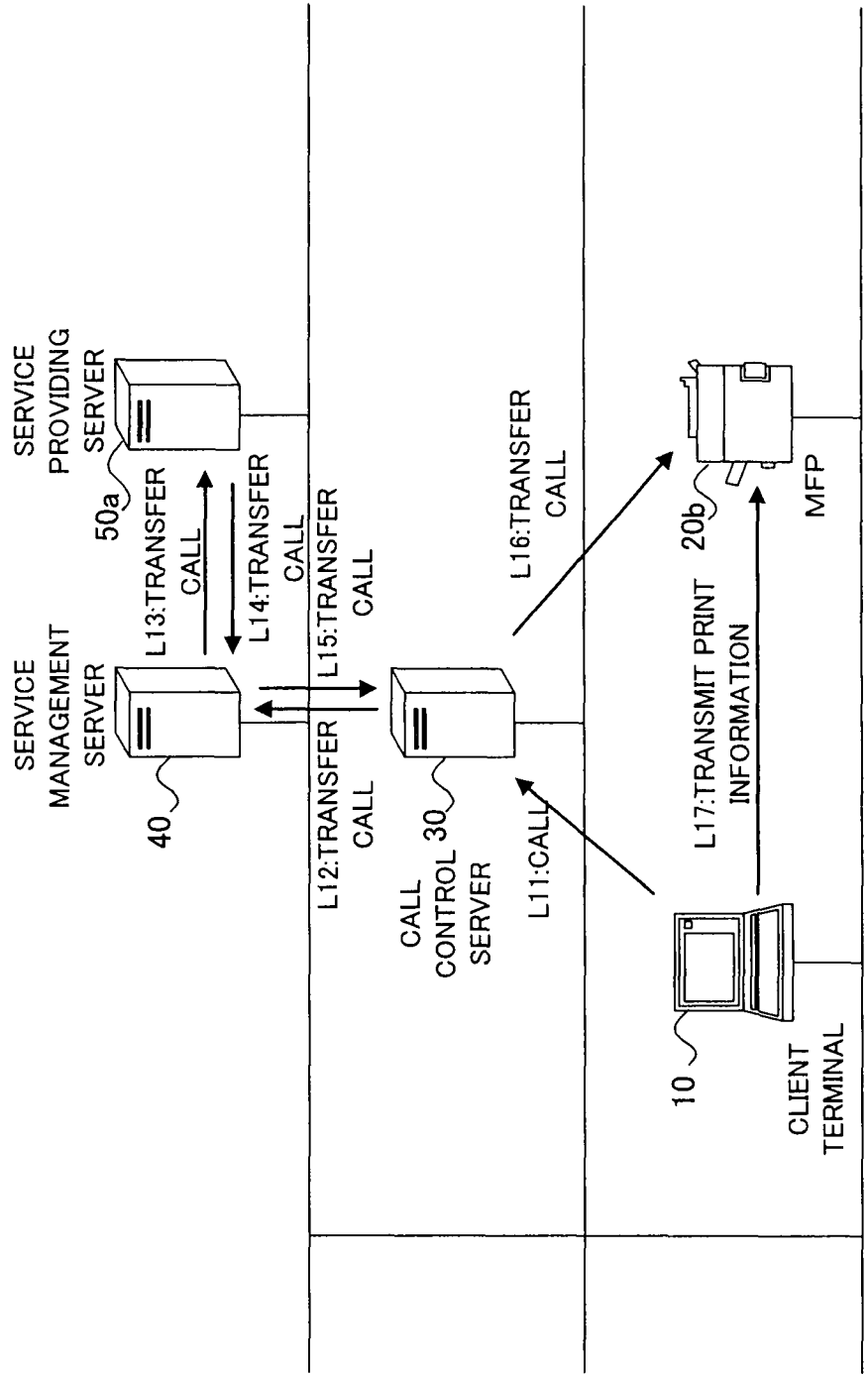
FIG. 3 is a drawing for explaining a modification example of the operation of the printing service management system according to the embodiment of the present invention.

In the above explanation (see FIG. 2), the print information is transmitted from the client terminal 10 to the MFP 20*b* via the service providing server 50*a*. However, the print information may be directly transmitted from the client terminal 10 to the MFP 20*b*. The system operation of this case will be explained with reference to FIG. 3. Also in this case, as well as the above described explanation, an employee of a company A is to print data, which is retained by the client terminal 10, from the MFP 20*b*, which is installed in a store B, which is a satellite office.

First, the employee inputs the ID of the MFP 20*b* and an execution request of a printing service (for example, printer output of data) to the client terminal 10 that he/she owns. In response to this operation, the client terminal 10 transmits a request message (call) including the data of the ID of the user, the ID of the MFP, and the printing service contents to the call control server 30 (L11).

The call control server 30 carries out user authentication based on the received user ID and checks whether the MFP 20*b*, which is specified by the received MFP ID, can be used or not. When the check results of both of them are acceptable, the call control server 30 generates a session management ID, records session management information in the session management table of the storage unit, adds the session ID to the request message, which is from the client terminal 10, and transfers the message to the service management server 40 (L12). In response to this, the service management server 40 transfers the request message to the service providing server 50a corresponding to the print request (in this case, the server of the company A) (L13). The service providing server 50a transfers the received request message to the service management server 40 (L14). In this process, the service providing server 50a may carry out necessary processing (for example, storing the contents of the request message) based on the received request message. Then, the service management server 40 further transfers the received request message to the call control server 30 (L15), and the call control server 30 transfers the received request message to the MFP 20b (L16). As a result, a session is established between the client terminal 10 and the MFP 20b.

Then, when the employee of the company A inputs a print request to the client terminal 10, the client terminal 10 transmits the print information including the print data, session ID, etc. to the MFP 20b together with the print request (L17). In response to this, the MFP 20b prints out the received print data.

Figure 4:
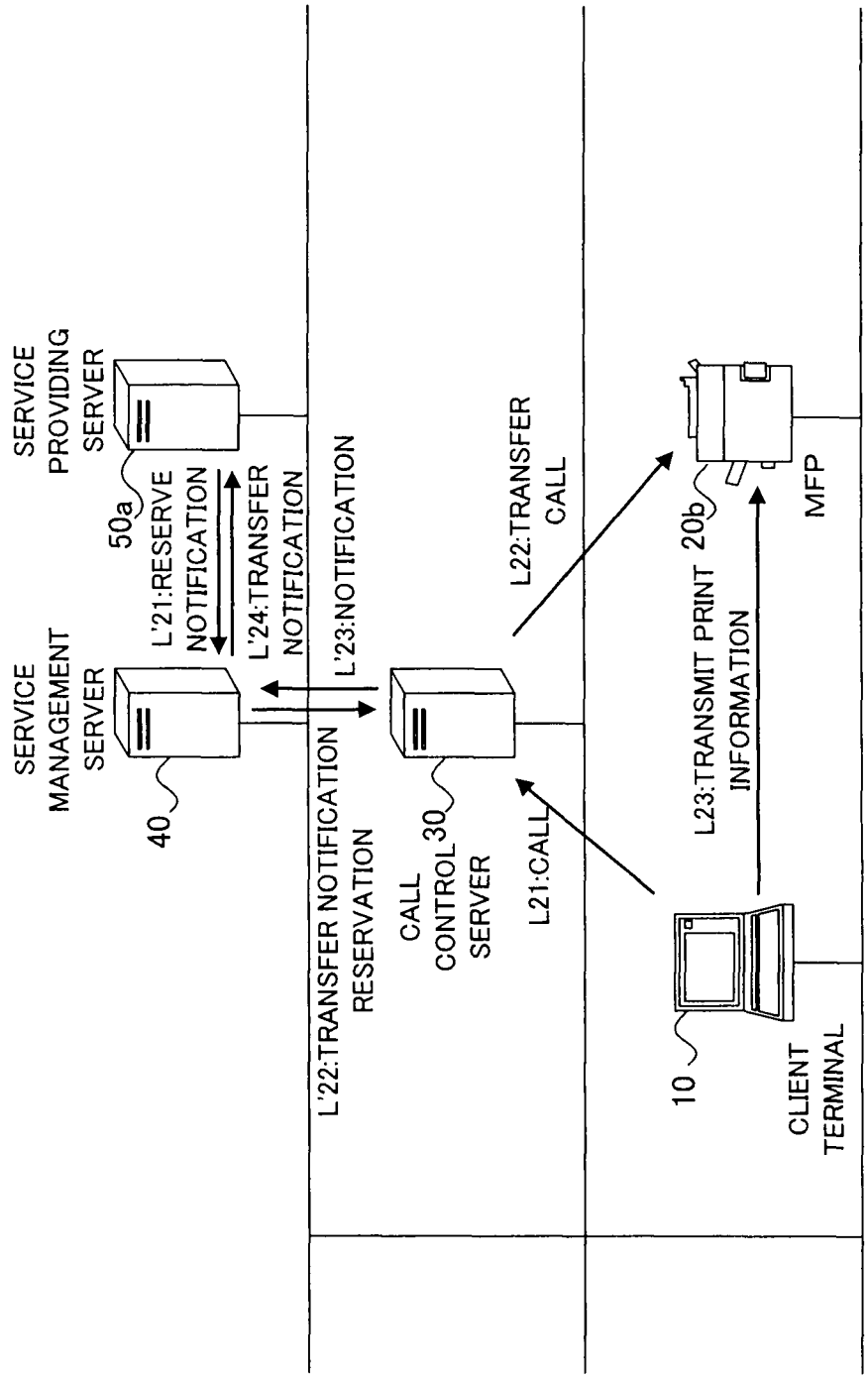
FIG. 4 is a drawing for explaining a modification example of the operation of the printing service management system according to the embodiment of the present invention.

In the above described explanation (see FIG. 3), the request message (call) is transmitted from the client terminal 10 to the MFP 20b via the service providing server 50a so that usage of the printing service can be notified to the service providing server 50a. However, a reservation may be made in advance so that notification to the service providing server 50 is carried out when a request message (call) to the MFP 20b is generated from the client terminal 10. The system operation of this case will be explained with reference to FIG. 4.

For example, as preprocessing, the service providing server 50a (in this case, the server of the company A) transmits a notification reservation, which requests reception of a notification when a request message (call) about the company A is generated, to the service management server 40 (L'21). The service management server 40 transfers the received notification reservation to the call control server 30 (L'22).

Next, the employee of the company A inputs the MFP ID of the MFP 20b and an execution request of a printing service (for example, printer output of data) to the client terminal 10 that he/she owns. In response to this operation, the client terminal 10 transmits a request message (call) including the user ID, the MFP ID, and the data of the printing service contents to the call control server 30 (L21).

The call control server 30 carries out user authentication based on the received user ID and checks whether the MFP 20b specified by the received MFP ID can be used or not. When the check results of both of them are acceptable, the call control server 30 generates a session management ID, records session management information in the session management table of the storage unit, adds the session ID to the request message, which is from the client terminal 10, and transfers the message to the MFP 20b (L22). The MFP 20b, which has received the request message, transmits a response message to the call control server 30, and the call control server 30 transfers the response message to the client terminal 10. As a result, a session is established between the client terminal 10 and the MFP 20b.

In addition, since the call control server 30 has received the request message from the user who belongs to the company A, the call control server 30 transmits a notification, which includes the contents of the received request message, based on the previously-received notification reservation to the service management server 40 (L'23), and the service management server 40 transfers the request message to the service providing server 50a corresponding to the received notification (in this case, the server of the company A) (L'24). The service providing server 50a carries out necessary processing (for example, storing the contents of the request message) based on the received request message.

On the other hand, at the client terminal 10, when a print request is input by the employee of the company A, the client terminal transmits the print information including the print data, session IDs, etc. to the MFP 20b together with the print request (L23). In response to this, the MFP 20b prints out the received print data.

Figure 5:
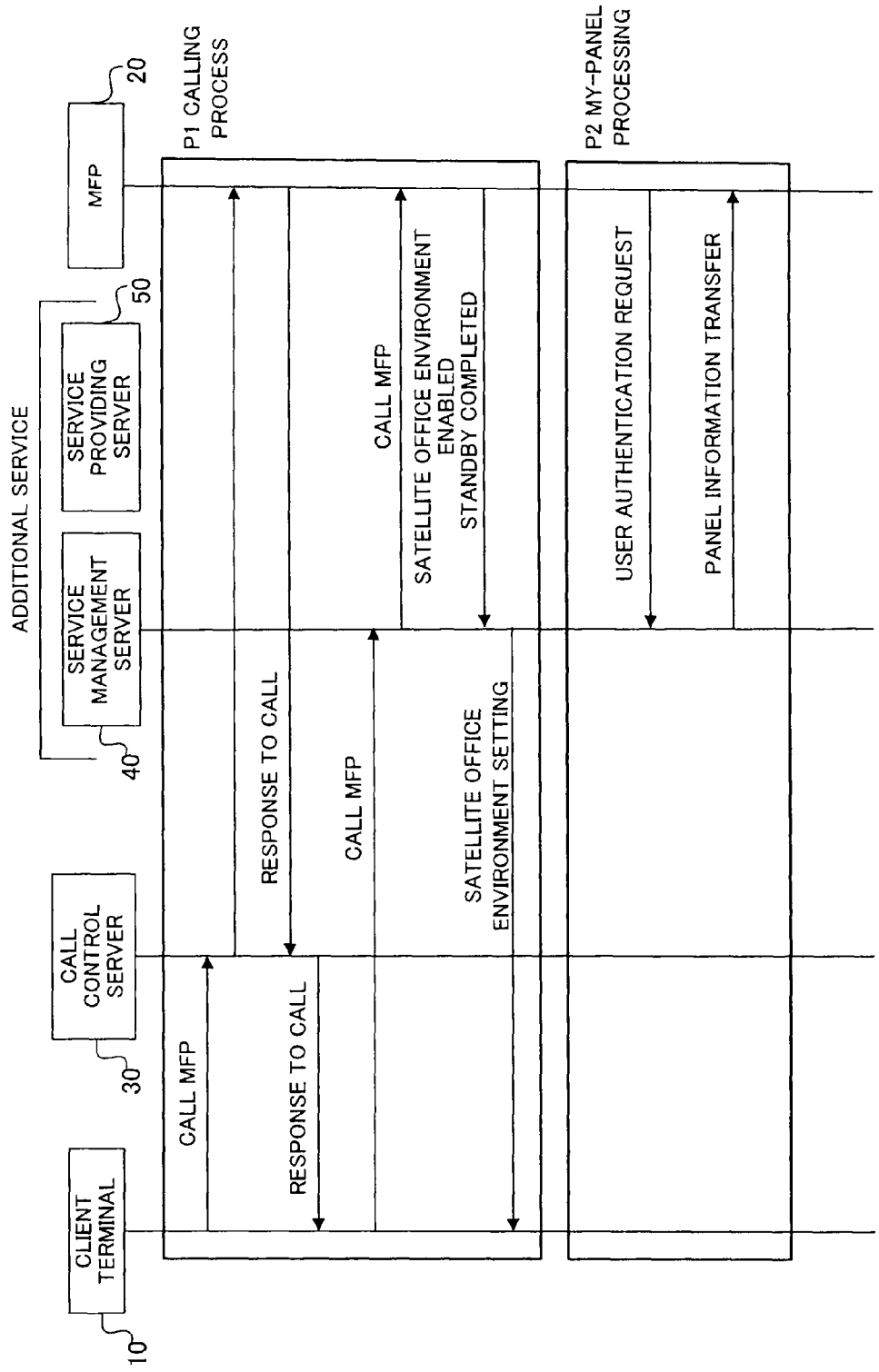
FIG. 5 is a drawing for explaining the flow of a personal panel display process.

Moreover, in the printing service management system according to the present embodiment, a work area for each user is retained by the service providing server 50, etc. The work area stores portable personality information, personal documents, shared folder information, and the information of information links within the organization, etc. Among the information, the portable personality information includes, for example, the information of frequently used usage contents extracted from the usage history of the MFP 20 of the user, operation button contents of the MFP 20 set by the user, operation button contents of the MFP 20 set in advance by the organization to which the user belongs. When the portable personality information is used, the button display which is displayed on an operation panel of the MFP 20 which is in a satellite office can be changed depending on the user or the organization to which the user belongs. The flow of the personal panel display process will be explained below with reference to FIG. 5.

Figure 6:
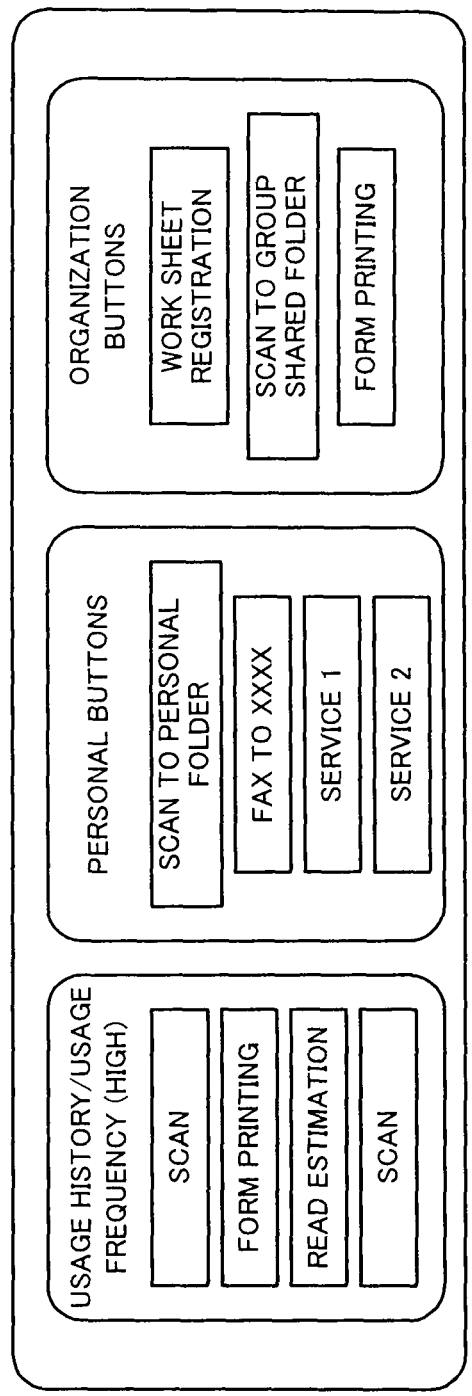
FIG. 6 is a drawing exemplarily showing a personal panel displayed in an input operating unit of a MFP.

First, the client terminal 10 calls the MFP 20 via the call control server 30. The call control server 30 carries out the above described check processes, etc. of the user ID and the MFP ID so as to establish a session between the client terminal 10 and the MFP 20. Then, the client terminal 10 calls the MFP 20 via the service management server 40 and enables a satellite office environment (P1: calling process). Then, the user carries out a user authentication operation in front of the MFP 20, and the MFP 20 transmits a user authentication request to the service management server 40. The service management server 40 carries out a user authentication processing in cooperation with the corresponding service providing server 50. When the user authentication result is correct, the service management server reads the portable personality information from the work area corresponding to the user and transfers the panel information based on that to the MFP 20. The MFP 20 carries out panel display based on the received panel information (P2: my-panel processing). An example of the personal panel displayed in the input operating unit of the MFP 20 is shown in FIG. 6. Note that the authentication method of the user is arbitrary and may use, for example, IC card authentication or biometric authentication.

Moreover, in the printing service management system according to the present embodiment, the total amount of the usage fee of the MFP 20 and the usage fee of the services is collected from the company A which is the organization to which the user belongs, and the price of the usage of the MFP 20 is paid to a company B which serves as the satellite office. In the billing process, for example, in response to the print request from the client terminal 10, the service providing server 50 transmits and presents billing (point) data about usage of the device and printing services to the client terminal 10 and registers the billing information in the print bill DB. The user can carry out evaluation about the usage from the client terminal 10. The client terminal 10 transmits input evaluation value data to the service providing server 50, and the service providing server 50 also registers the received evaluation value data in the print bill DB. An example of the bill information registered in the print bill DB is shown in FIG. 7.

Second Embodiment

Hereinafter, a printing service management system according to another embodiment of the present invention will be explained with reference to drawings. The present embodiment has a configuration in which the service management server 40 carries out part of the functions of the call control server 30 of the first embodiment.

As well as FIG. 1, the system configuration of the printing service management system according to the present embodiment has client terminals 10, a Multifunction Printer (MFP) 20, a call control server 30, a service management server 40, and a service providing server 50. These apparatuses are connected via a network such as Next Generation Network (NGN) or the Internet.

The client terminals 10 include personal computers, portable terminals, portable phones, etc., and each client terminal comprises a computer having a control unit, a storage unit, a communication unit, an input unit, and a display unit. The control unit of the client terminal 10 carries out processing for using various printing services by reading and executing operation programs stored in the storage unit. In addition, the storage unit of the client terminal 10 stores information such as IDs for identifying users.

The MFP 20 is an apparatus which is installed in a satellite office such as a tea parlor or a store and has a plurality of image formation functions of a copy machine, a printer, a fax machine, etc., and the MFP has a control unit, a storage unit, an input operating unit, a printing unit, and a communication unit. The storage unit of the MFP 20 stores information such as an ID for identifying the MFP 20.

The call control server 30 comprises a computer having a control unit, a storage unit, and a communication unit. The control unit carries out processing such as session management based on a call control protocol of, for example, Session Initiation Protocol (SIP) between the terminals (the client terminals 10, the MFP 20, the service management server 40, the service providing server 50) by reading and executing the operation programs stored in the storage unit. Note that these terminals are uniquely specified on the network by IDs of, for example, SIP Universal Resource Identifiers (SIP URIs). The storage unit of the call control server 30 has a client information DB 31 (see FIG. 13). The client information DB 31 may be built as a database on the network instead of that in the storage unit of the call control server 30.

FIG. 8 exemplarily shows the information stored in the client information DB 31.

In the client information DB 31, the information of the terminals of which sessions are managed by the call control server 30 (the client terminals 10, the MFP 20, the service management server 40, and the service providing server 50) is registered. The information of the terminal includes IDs of the terminals, security information (authentication/permission information), etc. The information of the client terminals 10 (users) further includes the information of the usage-contracted services (for example, the ID of the service management server 40).

The service management server 40 comprises a computer having a control unit, a storage unit, and a communication unit. The control unit carries out processing for managing provision of printing services by reading and executing operation programs stored in the storage unit. Specifically, the service management server 40 receives a call transferred from the call control server 30, carries out appropriate processing based on the information included in the call and the information of the storage unit, and transfers it. It is desirable that the calls that are related to services are configured to be transferred via the call control server. As a result, a common function, for example, recording service usage logs can be provided for various services. The storage unit has a device management DB 41, a contract organization DB 42, a user DB 43, and a service information DB 44 (see FIG. 13). These DBs permit access from the service providing server 50 in accordance with needs. Alternatively, these DBs may be built as a database on the network.

FIG. 9 exemplarily shows the information stored in the device management DB 41. In the device management DB 41, MFP information about the MFP 20 used in the present system (for example, the ID of the MFP 20, the device name of the MFP, the organization ID of the organization to which the MFP 20 belongs, usage history information of the MFP 20) is registered.

FIG. 10 exemplarily shows the information stored in the contract organization DB 42. In the contract organization DB 42, organization information about the organization which has a contract for the printing services provided by the present system (for example, the organization ID, the organization name, the services which can be used by the organization, usage history information of each organization, etc.) is registered.

FIG. 11 exemplarily shows the information stored in the user DB 43. In the user DB 43, user information about the user who belongs to the organization which has the contract for the printing services by the present system (for example, the ID and the name of the user, the organization ID of the organization to which the user belongs, the ID of the service which can be used by the user, usage history information of each user) is registered.

FIG. 12 exemplarily shows the information stored in the service information DB 44. In the service information DB 44, information about the services provided by the service providing server 50 (for example, the service ID, the ID of the service providing server, usage history of each service) is registered.

The service providing server 50 comprises a computer having a control unit, a storage unit, and a communication unit. The control unit carries out predetermined printing service processing by reading and executing operation programs stored in the storage unit. A plurality of service providing servers 50 may be installed. For example, when the service providing servers are installed respectively for the services, distribution of service processing load can be realized.

The printing services include, for example, conversion/accumulation/multicast of print data, print function restrictions, recording of print logs, billing. The storage unit has various types of DBs used in the services provided by the service providing server 50. The DBs of various types include, for example, a print data DB in which print data is saved, a print policy DB in which restriction contents of print functions (for example, "multicast is for ten people at most") are registered, a print log DB in which print logs are recorded, a print bill DB in which bill information is recorded. These DBs permit access from other service providing servers in accordance with needs. Alternatively, these DBs may be built as databases on a network.

Next, operation of the printing service management system according to the embodiment of the present invention will be explained with reference to FIG. 13 and FIG. 14 by taking the case in which a user uses a satellite office printing service as an example. As well as the first embodiment, an employee of a company A is to print a file, which is retained by the client terminal 10, from the MFP 20b installed in a store B, which is a satellite office.

First, on the client terminal 10 which he/she owns, the employee specifies the ID of the MFP 20b, a path (or URL) of a file, and print setting as arguments so as to request execution of a printing service. In response to this operation, the client terminal 10 transmits a request message (call 1) including the ID of the user, the ID of the MFP, and service information including the service ID, etc. of the printing service to the call control server 30 (step S101).

The call control server 30 carries out user authentication based on the received ID of the user (step S102). Specifically, the call control server acquires client information which has the ID of the user as a key from the client information DB 31 and carries out authentication based on security information which is included in the acquired client information. This authentication is, for example, basic authentication using a user name and a password. When the user is authenticated as a result of the authentication, the call control server 30 checks the service required by the call 1. Specifically, whether the service ID included in the service information of the call 1 is registered in the above described client information or not is checked. If it is registered, the ID of the transfer destination of the call associated with the service ID (herein, the ID of the service management server 40, which is sip: srv_mgr@ricoh.co.jp) is acquired from the client information. The call control server 30 transfers the call 1 to the service management server 40 (step S103).

The service management server 40 carries out second authentication (service authentication/permission) based on the user ID, the MFP ID, and the service information included in the call 1 transferred from the call control server 30 (step S104). Specifically, the service management server 40 reads the user information from the user DB 43 by using the user ID as a key, checks whether the service is registered therein or not, reads the MFP information from the device management DB 41 by using the MFP ID as a key, and checks whether the user belongs to the organization to which the MFP belongs. As a result, the printing service can be provided only to the contractor of the service, and the contractor is allowed to use only the MFP of the organization of the contractor while MFPs of different organizations are subjected to consolidated management.

When usage of the service is permitted, the service management server 40 determines the transfer destination of the call 1 based on the service information. Specifically, the service management server carries out a search in the service information DB 44 by using the service ID as a key so as to acquire the information of the service providing server associated with the service ID (in this case, the ID of the service providing server 50a, i.e., sip: srv@ricoh.co.jp). When the transfer destination is determined, the service management server 40 transfers the call 1 to the service providing server 50a (step S105). At this point, the service management server 40 records usage history of the service in the service information DB 44.

The service providing server 50a, which has received the call 1, transmits a response message to the call control server 30 (step S107) via the service management server 40 (step S106). The call control server 30 transfers the response message to the client terminal (step S108). As a result, a session (print information transmission session) is established between the client terminal 10 and the service providing server 50a.

Next, the client terminal 10 generates print data from the file in accordance with the print setting input by the employee of the company A and transmits the print information including print data, etc. to the service providing server 50a (step S109). In response to this, the service providing server 50a executes predetermined printing service processing based on the received print information (for example, converts the print data to print data that is supported by the MFP 20).

Subsequent operation processing of the printing service management system will be explained by using FIG. 14. When the printing service processing by the service providing server 50a is completed, the service providing server 50a transmits a request message (call 2) including the ID of the MFP 20b and the printing service information to the call control server 30 (step S202) via the service management server 40 (step S201).

The call control server 30 transfers the call 2, which is from the service providing server 50a, to the MFP 20b (step S203). The MFP 20b, which has received the call 2, transmits a response message to the call control server 30 (step S204). The call control server 30 transfers the response message to the service providing server 50a (step S206) via the service management server 40 (step S205). As a result, a session (print information transmission session) is established between the service providing server 50a and the MFP 20b.

Then, the service providing server 50a transmits the print information including the print data to the MFP 20b (step S207). In response to this, the MFP 20b prints out the received print data.

The printing service processing executed by the service providing server 50a in response to step S109 includes, for example, conversion, accumulation, multicast of the print data, print function restriction, recording of print logs, and billing.

Figure 13:
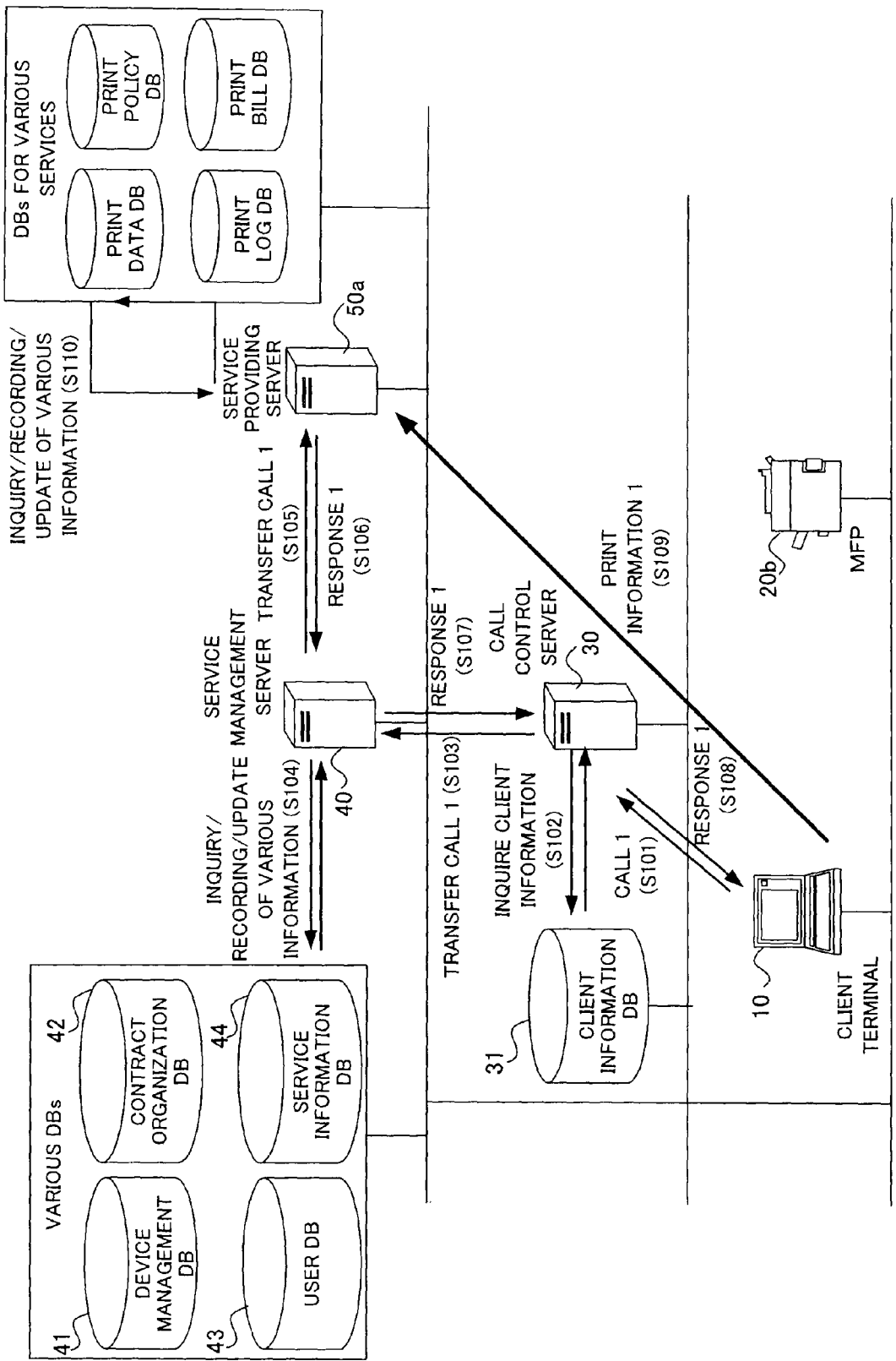
FIG. 13 is a drawing for explaining operation of a printing service management system according to a second embodiment.
Figure 14:
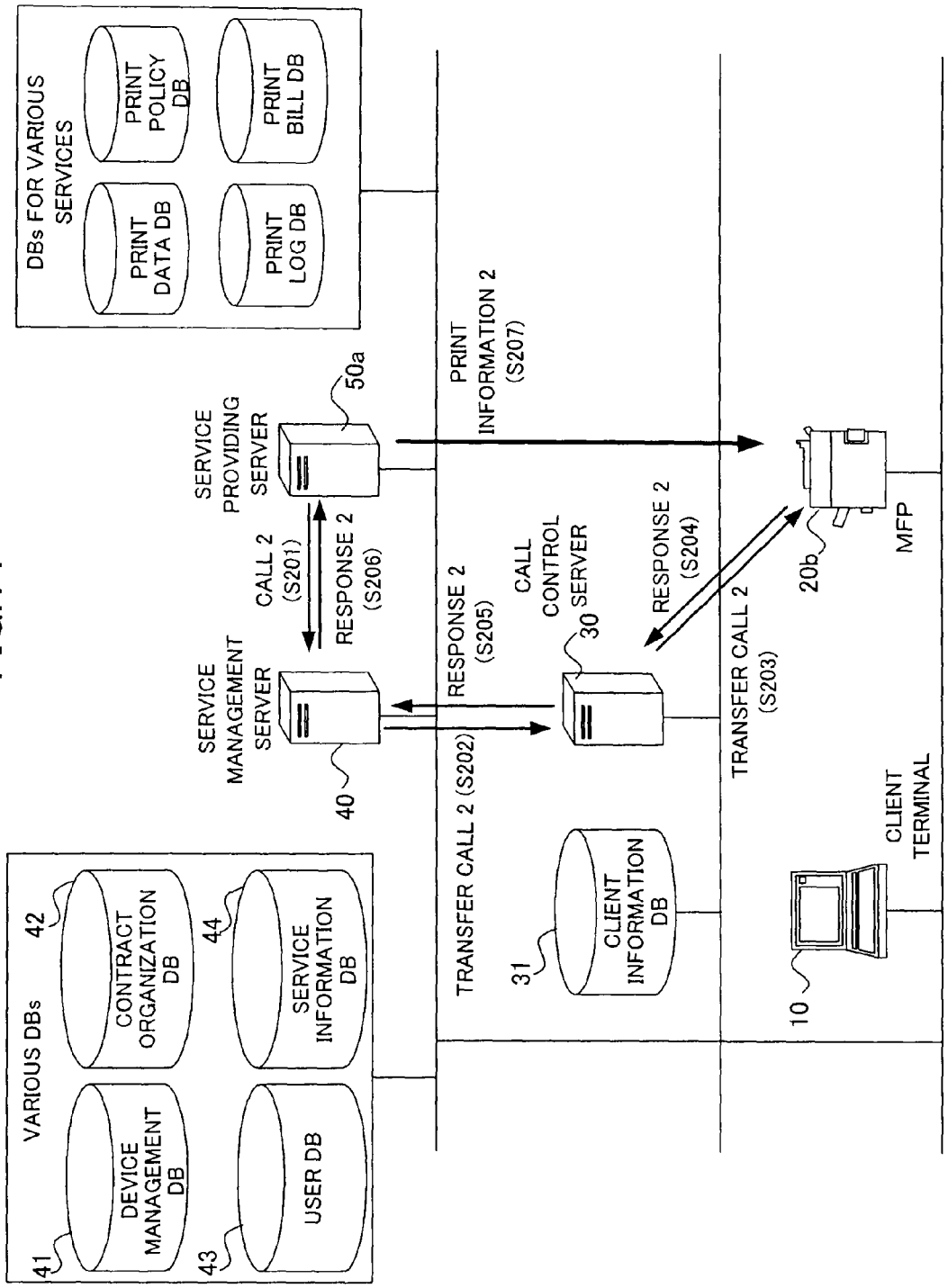
FIG. 14 is a drawing for explaining the operation of the printing service management system according to the second embodiment of the present invention.

If the printing service processing is conversion of the print data, the service providing server 50a carries out predetermined conversion processing (for example, format conversion, synthesis with other data) of the print data, which has been received from the client terminal 10, (FIG. 13, step S110). Then, in step S207, the print data after conversion is transmitted to the MFP 20b.

If the printing service processing is accumulation of the print data, the service providing server 50a saves the print data, which has been received from the client terminal 10, in the print data DB built in the storage unit of the service providing server 50a.

If the printing service processing is multicast of the print data, the service providing server 50a transmits a request message (call) which specifies the MFP IDs of the MFPs 20 at a plurality of transfer destinations to the call control server 30 via the service management server 40. The call control server 30 transmits the request message (call) to each of the MFPs 20 so as to establish session between the service providing server 50a and each of the MFPs 20. Then, the service providing server 50a transmits the print data to each of the MFPs 20.

If the printing service processing is print function restriction, the service providing server 50a references the print policy DB, which is built in the storage unit, so as to determine whether the print information violates the restriction contents or not. In the case of violation, the service providing server transmits an error message to the client terminal 10.

If the printing service processing is recording of print logs, the service providing server 50a saves a print log in the print data DB, which is built in the storage unit thereof.

If the printing service processing is billing, the service providing server 50a references the print bill DB, which is built in the storage unit of the service providing server 50, and records billing information as well as the first embodiment.

In this manner, the service providing server 50*a* is capable of carrying out inquiry/recording/update of various information by accessing the various DBs in accordance with the types of the services to be provided (step S110).

Figure 15:
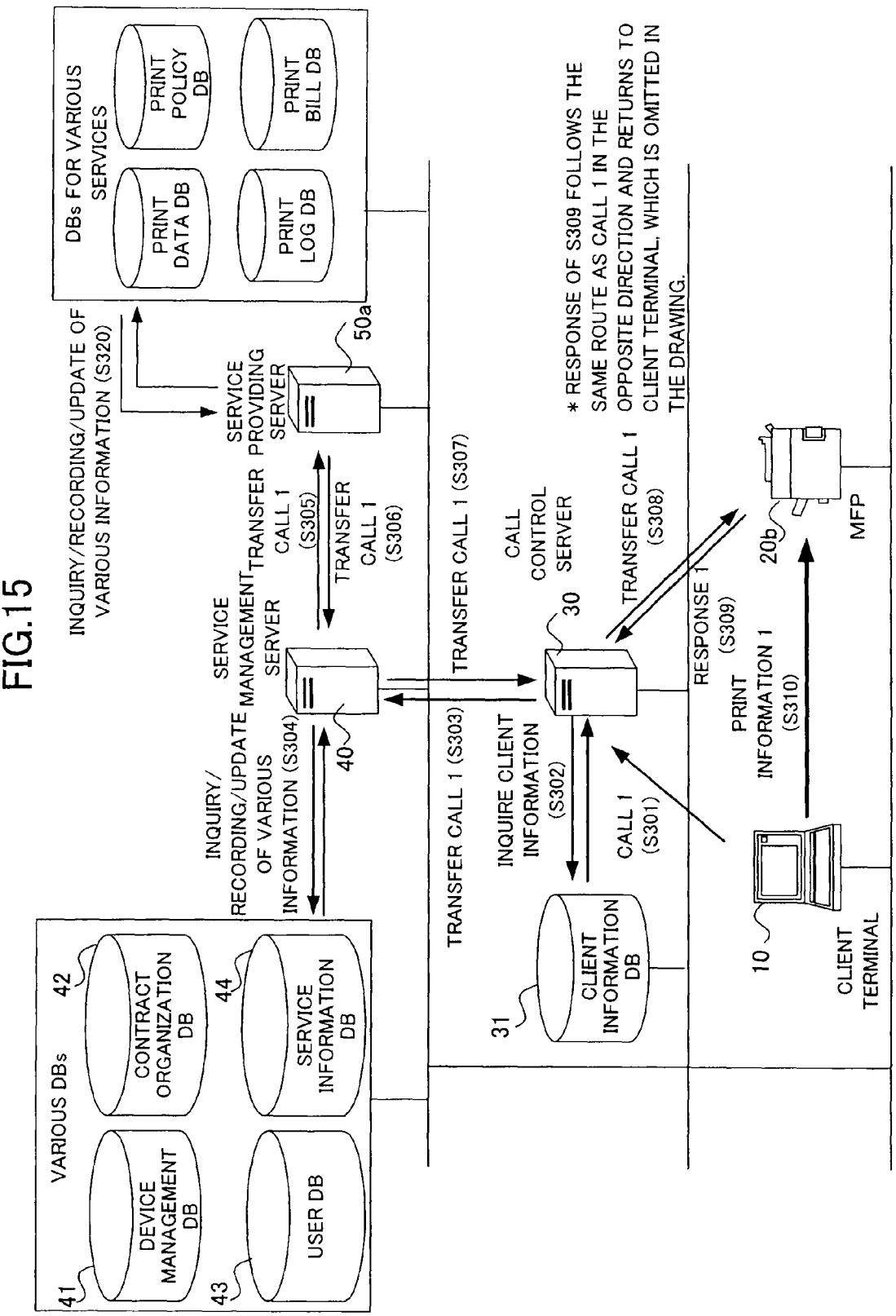
FIG. 15 is a drawing for explaining a modification example of the operation of the printing service management system according to the second embodiment of the present invention.

In the present embodiment (see FIG. 13 and FIG. 14), the print information is transmitted from the client terminal 10 to the MFP 20 via the service providing server 50. However, the print information may be directly transmitted from the client terminal 10 to the MFP 20. The system operation of this case will be explained with reference to FIG. 15. Also in this case, as well as the above described explanation, an employee of a company A is to print data, which is retained by the client terminal 10, from the MFP 20*b* installed in a store B, which is a satellite office.

First, on the client terminal 10 which he/she owns, the employee specifies the ID of the MFP 20*b*, a path (or URL) of a file, and print setting as arguments so as to request execution of a printing service (for example, printer output of the data). In response to this operation, the client terminal 10 transmits a request message (call 1) including the ID of the user, the ID of the MFP, and service information including the service ID, etc. of the printing service to the call control server 30 (step S301).

The call control server 30 carries out user authentication based on the received ID of the user. Specifically, the call control server reads client information from the client information DB 31 by using the ID of the user as a key and carries out authentication based on security information which is included in the client information. This authentication is, for example, basic authentication using a user name and a password. When the user is authenticated as a result of the authentication, the call control server 30 checks the service required by the call 1. Specifically, whether the service ID included in the service information of the call 1 is registered in the above described client information DB 31 or not is checked. If it is registered, the ID of the transfer destination of the call 1 (in this case, the ID of the service management server 40) is acquired (step S302) from the client information DB 31 by using the service ID as a key. The call control server 30 transfers the call 1 to the service management server 40 (step S303).

The service management server 40 carries out second authentication (service authentication/permission) based on the user ID, the MFP ID, and the service information included in the call 1 transferred from the call control server 30 (step S304). Specifically, the service management server 40 reads the user information from the user DB 43 by using the user ID as a key, checks whether the service is registered therein or not, reads the MFP information from the device management DB 41 by using the MFP ID as a key, and checks whether the user belongs to the organization to which the MFP 20*b* belongs. As a result, the printing service can be provided only to the contractor of the service, and the contractor is allowed to use only the MFP of the organization of the contractor while MFPs of different organizations are subjected to consolidated management.

When usage of the service is permitted, the service management server 40 determines the transfer destination of the call 1 based on the service information. Specifically, the service management server 40 carries out a search in the service information DB 44 by using the service ID as a key so as to acquire the information of the service providing server 50 that is associated with the service ID (in this case, the information of the service providing server 50*a*). When the transfer destination is determined, the service management server 40 transfers the call 1 to the service providing server 50*a* (step S305). The service providing server 50*a* transfers the received call 1 to the service management server 40 (step S306). At this point, the service providing server 50*a* may carry out necessary processing (for example, storing the contents of the request message (step S320)) based on the received request message.

The service management server 40 further transfers the received call 1 to the call control server 30 (step S307). The call control server 30 transfers the received request message to the MFP 20*b* (step S308). Note that, as well as the above described process, when the MFP 20*b* receives the call 1, the MFP 20*b* transmits a response message (response 1) to the call control server 30 (S309). This response is transferred to the client terminal 10 along with the path through which the call 1 has been transferred in the opposite direction. When the client terminal 10 receives the response, a session is established between the client terminal 10 and the MFP 20*b*.

Then, print data is generated from the file in accordance with the print setting input by the employee of the company A, and the print information including the print data, etc. is transmitted to the MFP 20*b* (step S310). In response to this, the MFP 20*b* executes a printing process based on the received print information.

As explained above, according to the second embodiment of the present invention, the network printing system capable of safely providing printing services such as satellite office services by a simple system configuration can be realized by carrying out the second authentication processing about the user and the device by the service management server 40.

Note that various modifications and applications can be made in the present invention.

For example, in the above described billing process, a fee corresponding to the evaluation value by the user may be set. In this case, for example, the service providing server 50 may calculate the fee based on the evaluation set in the bill information (FIG. 7) of the print bill DB (for example, the fee is discounted by 20 yen when the evaluation is "X"). Alternatively, another fee calculation method may be employed. For example, the time taken until printed paper is discharged from the MFP 20 may be measured by the MFP 20 and transmitted to the service providing server 50, and the service providing server 50 may discount the fee by a predetermined price if the received measured time is longer than predetermined time (for example, standard waiting time which depends on the user or MFP 20) by predetermined time or more. Also, the MFP 20 may check whether a drum of the printing unit is dirty or not and transmit the check result to the service providing server 50, and the fee may be calculated in the service providing server 50 based on the check result (for example, the fee is discounted if it is dirty).

Also, the service providing server 50 may calculate the fee based on the degree of contribution of the user or the organization to environmental load reduction. For example, the rate of 2 in 1 (print out the amount corresponding to 2 pages on one sheet), the rate of shredding and recycling, the rate of using recycled paper, the rate of using a recycle machine at a high frequency may be registered in a DB, the average values thereof and the values thereof of the user (or the organization of the user) may be compared, and the fee may be, for example, discounted based on the comparison results.

In the above described explanations, the cases in which satellite office services are provided by the present system have been described. However, for example, the services provided by the present system are not limited thereto, and services such as a remote conference system, a store information management service, an electronic private mail box support service (consolidated management/providing service of personal information such as medical records provided by private businesses) may be provided.

For example, in the remote conference system, the sessions of the apparatuses (the client terminal 10, a camera, a monitor, the MFP 20, etc.) of an instructor side and the apparatuses of a student side may be associated by using cameras and monitors having communication units. The data of the class contents given by the instructor may be saved in a DB by the service providing server 50 and may be printed by the MFP 20 of the instructor or the student.

In the store information management service, for example, sales information of a store may be scanned by the MFP 20, transmitted to the service providing server 50, and managed in a DB by the service providing server 50. Correction or conversion of the data may be carried out from the client terminal 10 such as a portable phone or the MFP 20.

In the electronic private mail box support service, for example, the service providing server 50 may manage the personal information such as medical records in a DB so that a user can access the personal information of his/her own from the client terminal 10 by using an IC card (a health IT card having a biometric authentication function) and, for example, print it from the MFP 20.

The printing apparatus is not limited to the MFP 20 as long as it is an apparatus having the communication unit and the printing unit. The number of services provided by one service providing server 50 is arbitrary.

The transmissions of the request messages (calls) between the devices in the printing service management systems according to the present invention may be based on any protocol. The protocol may be any protocol that establishes mutual communications between the devices such as Session Initiation Protocol (SIP) or Hyper Text Transfer Protocol (HTTP).

The printing service management systems of the present invention can be realized by using a normal computer system instead of a dedicated system. For example, programs for executing the above described operations may be stored in a computer-readable recording medium (FD, CD-ROM, DVD, etc.) and distributed, and the client terminal 10, the call control server 30, the service management server 40, the service providing server 50, etc. may be built by installing the programs in a computer. Alternatively, the programs may be stored in a disk apparatus owned by a server apparatus on a network such as the Internet and downloaded to, for example, a computer.

For example, in the case in which the above described functions are shared by an OS or realized by cooperation of the OS and applications, merely the part other than that of the OS may be stored in a medium and distributed or, for example, downloaded to a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications No. 2008-159891 filed on Jun. 19, 2008 and No. 2009-111049 filed on Apr. 30, 2009 and including specification, claims, drawings and summary. The disclosure of the above Japanese Patent Applications is incorporated herein by reference in its entirety.

What is claimed is:

1. A printing service providing method of a system comprising a client terminal, a printing apparatus, a call control server, and a printing service server connected to a network, the printing service providing method including:
   a step of transmitting a call request, which is for using the printing apparatus, by the client terminal to the call control server;
   a first authentication step of receiving the call request and carrying out authentication processing based on the call request by the call control server;
   a specification step in which the printing service server specifies identification of an organization to which the printing apparatus belongs based on identification of a printing apparatus included in a call request authenticated by the first authentication step;
   the printing apparatus being associated with identification of the printing apparatus stored in the device management database;
   wherein in the first authentication step, the call control server checks whether identification information of the client terminal and identification information of the printing apparatus received together with the call request is registered in a database or not;
   a session ID is given if the server determines that both the identification information of the client terminal and identification information of the printing apparatus within the call request is registered in the database;
   a print request is sent from the Client terminal which includes a print data, and the session ID;
   a second authentication step including a second authorization processing of checking whether a user corresponding to identification of a user included in the call request belongs to the organization corresponding to the identification of the organization to which the printing apparatus specified by the specification step belongs by reading from the device management database, information of the organization to which the printing apparatus belongs based on the identification of the printing apparatus as a key;
   a step of, if a result of the authentication processing carried out in the second authentication step is correct, establishing a session between the client terminal and the printing apparatus, and the printing service server by the call control server; and
   a printing service providing step of carrying out processing for providing a predetermined printing service by the printing service server based on the call request.

2. The printing service providing method according to claim 1, wherein the call control server includes a Session Initiation Protocol server.

3. The printing service providing method according to claim 2, wherein in the first authentication step, the call control server checks whether identification information of the client terminal and identification information of the printing apparatus received together with the call request is registered in a database or not.

4. The printing service providing method according to claim 3, wherein the printing service providing step includes processing of transmitting print information, which is received from the client terminal, to the printing apparatus by the printing service server.

5. The printing service providing method according to claim 4, wherein the printing service provided by the printing service providing step includes at least one of: conversion of the print data, accumulation of the print data, multicast of the print data, restriction of a print function, recording of a print log, and billing about printing.

6. A printing service providing method of a printing service providing system comprising a client terminal, a printing apparatus, a call control server, and a printing service management server connected to a network, the printing service providing method including:
- a step of transmitting a request message to the call control server by the client terminal, the request message including information specifying the printing apparatus;
- a transfer step of transferring the request message to the printing service management server by the call control server;
- a first authentication step of receiving the call request and carrying out authentication processing based on the call request by the call control server;
- a specification step wherein the printing service management server specifies identification of an organization to which a printing apparatus associated with identification of the printing apparatus stored in the device management database belongs,
- wherein in the first authentication step, the call control server checks whether identification information of the client terminal and identification information of the printing apparatus received together with the call request is registered in a database or not,
- a session ID is given if the server determines that both the identification information of the client terminal and identification information of the printing apparatus within the call request is registered in the database;
- a print request is sent from the Client terminal which includes a print data, the session ID;
- carries out a second authentication step including a second authentication processing by checking whether a user corresponding to identification of a user included in the call request belongs to an organization corresponding to identification of the organization to which the specified printing apparatus belongs by reading from the device management database, information of the organization to which the printing apparatus belongs based on the identification of the printing apparatus as a key,
- and specifying the printing apparatus;
- and a step of if a result of the authentication processing carried out in the authentication step is correct, establishing a session between the client terminal and the printing apparatus, and the printing service server by the call control server.

7. The printing service providing method according to claim 6, wherein the request message further includes information specifying a user and information about a printing service; and, in the authentication step, the printing service management server carries out the authentication processing based on the information specifying the user, the information about the printing service, and the information specifying the printing apparatus.

8. The printing service providing method according to claim 7, further including:
- a print information transmitting step of transmitting print information to the printing apparatus by the client terminal; and
- a printing step of executing printing process by the printing apparatus based on the transmitted print information.

9. The printing service providing method according to claim 7, wherein the printing service providing system further comprises a printing service server; and the printing service providing method further includes:
- a printing service providing step of carrying out processing for providing a predetermined printing service by the printing service server based on the request message.

10. The printing service providing method according to claim 9, wherein in the transfer step, the call control server carries out authentication processing of the client terminal and, if a result of the authentication is correct, transfers the request message to the printing service management server.

11. The printing service providing method according to claim 10, wherein in the printing service providing step, the printing service server receives print information from the client terminal and executes the predetermined printing service based on the received print information.

12. The printing service providing method according to claim 11, wherein the printing service provided by the printing service providing step includes at least one of: conversion of the print data, accumulation of the print data, multicast of the print data, restriction of a print function, recording of a print log, and billing about printing.

13. A printing service providing system comprising:
- a client terminal, a printing apparatus, a call control server, and a printing service management server connected to a network,
- wherein the client terminal comprises a transmitting unit transmitting a request message including information specifying the printing apparatus to the call control server;
- the call control server comprises a transfer unit transferring the request message to the printing service management server, the call control server establishing a session by generating a session ID, adding the session ID to the call request, and transferring the call request with the session ID to the printing service management server; and
- the printing service management server comprises an authentication unit carrying out a first authentication processing specifies identification of an organization to which a printing apparatus associated with identification of the printing apparatus stored in a device management database belongs,
- wherein in the first authentication step, the call control server checks whether identification information of the client terminal and identification information of the printing apparatus received together with the call request is registered in a database or not,
- a session ID is given if the server determines that both the identification information of the client terminal and identification information of the printing apparatus within the call request is registered in the database;
- a print request is sent from the client terminal which includes a print data, the session ID;
- carries out a second authentication processing by checking whether a user corresponding to identification of a user included in the call request belongs to an organization corresponding to identification of the organization to which the specified printing apparatus belongs by reading, from the device management database, information of the organization to which the printing apparatus belongs based on the identification of the printing apparatus as a key, and specifying the printing apparatus.

14. The printing service providing system according to claim 13, wherein the request message further includes information specifying a user and information about a printing service; and the authentication unit of the printing service management server carries out the authentication processing based on the information specifying the user, the information about the printing service, and the information specifying the printing apparatus.

15. The printing service providing system according to claim 14, wherein the client terminal further comprises a print information transmitting unit transmitting print information to the printing apparatus; and the printing apparatus further comprises a printing unit executing printing process based on the transmitted print information.

16. The printing service providing system according to claim 14, further comprising a printing service server, wherein the printing service server comprises a printing service providing unit carrying out processing for providing a predetermined printing service based on the request message.

17. The printing service providing system according to claim 16, wherein the transfer unit of the call control server carries out authentication processing of the client terminal and, if a result of the authentication is correct, transfers the request message to the printing service management server.

18. The printing service providing system according to claim 17, wherein the printing service providing unit of the printing service server receives print information from the client terminal and executes the predetermined printing service based on the received print information.

19. The printing service providing system according to claim 18, wherein the printing service provided by the printing service providing unit of the printing service server includes at least one of: conversion of the print data, accumulation of the print data, multicast of the print data, restriction of a print function, recording of a print log, and billing about printing.

20. The method according to claim 1, wherein the request message includes information specifying a user and information about a printing service when sent from the client to the call server, and the request message includes the information specifying the user, the information about the printing service, and the session ID when sent from the call control server to the printing service server.

21. The method according to claim 6, wherein the request message includes information specifying a user and information about a printing service when sent from the client to the call server, and the request message includes the information specifying the user, the information about the printing service, and the session ID when sent from the call control server to the printing service management server.

22. The system according to claim 13, wherein the request message includes information specifying a user and information about a printing service when sent from the client to the call server, and the request message includes the information specifying the user, the information about the printing service, and the session ID when sent from the call control server to the printing service management server.

* * * * *